United States Patent Office 3,492,147
Patented Jan. 27, 1970

3,492,147
METHOD OF COATING PARTICULATE SOLIDS WITH AN INFUSIBLE RESIN
Bill M. Young, Duncan, Okla., and Louis A. Weinrich, San Diego, Calif., assignors to Halliburton Company, Duncan, Okla., a corporation of Delaware
No Drawing. Filed Oct. 22, 1964, Ser. No. 405,859
Int. Cl. C04b 31/44; B44d 1/09; B22c 1/00
U.S. Cl. 117—62.2                                16 Claims

ABSTRACT OF THE DISCLOSURE

A process for the production of particulate solids coated with an infusible resin comprising mixing the solids with a liquid material containing a resin forming composition of furfuryl alcohol, or furfuryl alcohol resins, or mixtures thereof, and heating the coated solids in an oil bath which may contain a catalyst for the resin to thereby cure the resin on individual particles of the solids. Radioactive materials may be incorporated in the coating.

---

This invention relates to a method for coating solid materials and has particular reference to methods for the production of plastic-coated particulate solids and resulting products.

Methods have heretofore been proposed for providing particulate materials with partially-cured resin coatings, such as resin-coated sand for use in making foundry cores and resin-coated sand and other particulate materials for use in treating earth formations penetrated by wells. These methods have not met with full success, due in part at least to the extreme difficulty in preventing mutual adherence or agglomeration of the particles during and after the coating process, especially when carried out on a large scale. A primary object of the present invention is, therefore, to provide a novel process for the economical and quick production of resin-coated particulate materials, a process which is not subject to the aforesaid and other disadvantages of those heretofore proposed.

Another object of the present invention is to provide a novel process for the production of particulate solids having a coating thereon of an infusible resin.

Hydraulic fracturing is a common method of increasing the production from an oil or gas well, wherein a desired section of the earth formation is parted or fractured by the application of hydraulic or fluid pressure. Sand or other particulate material is generally added to the fracturing fluid as a propping agent to pack and fill the fracture and to thus hold it open when the applied pressure is dissipated. leaving a channel or channels of high flow capacity connected to the well bore. Solid or liquid radioactive materials are often used in such well fracturing operations, the radioactive material being carried into a created fracture and providing a source for gamma survey interpretation so that the exact area of the fracture can be determined. Radioactive sand or other particulate material is sometimes employed as a combined propping agent and radioactivity carrying medium, but wholly satisfactory methods for the tagging of such propping agents with a radioactive material have not heretofore been developed. Accordingly, another important object of the present invention is to provide a process for the production of novel propping agents containing radioactive isotopes and suitable for use in fracturing treatments.

Other objects and advantages of this invention it is believed will be readily apparent from the following detailed description of preferred embodiments thereof.

Briefly, this invention comprehends within its scope a process for the production of resin-coated particulate materials, wherein the particles are admixed or blended with a quantity of a liquid composition containing a thermosetting resin or a polymerizable monomeric material sufficient to coat the individual particles, followed by curing of the resin to a hard, infusible state, the blending and curing being carried out under conditions such that little or no adherence between the individual particles occurs.

Resins of the furfuryl alcohol type have been found to be particularly suitable for carrying out the process of the present invention, but the other resins of the type adapted to be cured from a liquid state to a solid, thermoset condition can be used, such other resins including urea-aldehyde resins, phenol-aldehyde resins, epoxy resins and polyester or alkyd resins. Polymerizable and curable monomeric materials such as mixtures of urea and formaldehyde, phenol and formaldehyde, furfuryl alcohol and furfural may be used in place of the liquid resins, especially where particularly thin coatings are desired. However, it has been found that furfuryl alcohol alone is an outstandingly superior monomeric material for such use.

The particulate material employed in the invention may be any pulverulent material unreactive with the liquid resin or monomer. Such materials include sand, nut shells, glass beads, aluminum pellets and others commonly used as propping agents for fracturing fluids. Particle sizes commonly employed vary between 10 and 100 mesh. The ratios of the amount of particulate material to amount of resin or resin-forming coating composition varies within wide limits, depending upon factors such as the desired thickness of coating and the specific characteristics of the coating composition and the particulate material, but generally between 0.5 and 5 parts by weight of resin or monomer composition are used for each 100 parts by weight of particulate solids.

In the use of the present process for the production of radioactive propping agents, a small quantity of a soluble or dispersible radioactive material, e.g., an isotope which will emit a substantial quantity of alpha, beta, or preferably gamma radiation is added to the resin or monomeric composition. Suitable isotopes include Zr-Nb$^{95}$ (zirconium-niobium$^{95}$), cobalt$^{60}$ and iridium$^{192}$.

In accordance with one embodiment of the present invention, the process is carried out by coating the particulate materials with a liquid, uncatalyzed resin composition characterized by the ability to extract a catalyst or curing agent from a non-aqueous solution, and then adding the thus coated solids to a catalyst-oil solution under conditions such that the resin composition rapidly extracts sufficient of the catalyst from the oil solution to effect a quick cure of the resin to the infusible state. In carrying out this embodiment of the process, the particles are amixed with the uncatalyzed resin or polymerizable material so as to encapsulate each particle in a thin envelope of the liquid material. The coated solids are then added slowly to the catalyst-oil solution with stirring, the operation being carried out at room or elevated temperatures, although this embodiment of the process is particularly efficacious in that it permits the utilization of relatively low temperature processing. For example, curing conditions of less than 5 minutes at about 80° F. can be utilized with suitable combinations of resin systems and catalysts. Curing of the resin or polymerization and curing of the monomeric material is so localized and fast that each particle remains separate and discrete, the oil solution also functioning as an incompatible medium for the coating composition, thereby further offering insurance against adherence of particles to each other. Upon completion of the curing, the non-aqueous solution is decanted from the treated solids. If desired, an appropriate surfactant can be added to the non-aqueous solution to facilitate more complete removal of the solids by a water washing operation.

Many acid or acid-producing catalysts or curing agents are available for use in the oil solution for the extraction-curing process of the present invention. Particularly suitable for use with coating compositions of the type containing furfuryl alcohol resins, urea-aldehyde resins, phenol-aldehyde resins and the like, are the acid and acid-forming curing agents disclosed in the copending application of Bill M. Young, Ser. No. 260,825 filed Feb. 25, 1963, U.S. Patent No. 3,209,826 and include halogenated aliphatic monocarboxylic acids such as trichloroacetic, chloroacetic, dichloroacetic, bromoacetic, iodoacetic, trifluoroacetic, monochlorodifluoroacetic, 2-chloropropionic, 3 - chloropropionic, perchloropropionic, perfluoropropionic and monochloroacetic; halogenated and nitrated aryl monocarboxylic acids such m-chlorobenzoic, p-chlorobenzoic, 2,4-dichlorobenzoic, 2,3,5-triiodobenzoic and o-nitrobenzoic; monocarboxylic acids such as acetic, acrylic, benzoic and vinyl acetic; halogenated alkyl aryl compounds such as benzotrichloride, a,a dichlorotoluene, a chlorotoluene, a,a,a,a',a',a', hexachloro-p-xylene, bromotoluene, a,a,a trifluorotoluene, a,a' dichloro-p-xylene, o,a,a,a tetrachlorotoluene, p,a,a,a tetrachlorotoluene, a,3,4 trichlorotoluene and a,a,2,6 tetrachlorotoluene; halogenated ketones such as hexachloroacetone, hexafluoroacetone, 1,3-dichloro-2-propanone, dichlorotetrafluoroacetone and trichlorotrifluoroacetone; esters of halogenated aliphatic carboxylic acids such as butyl trichloroacetate, butyl monochloroacetate, butyl dichloroacetate, methyl bromoacetate and methyl-2,3-dichloropropionate; esters of aliphatic dicarboxylic acids such as dibutyl oxalate, di-isopropyl oxalate and ethyl malonate; esters of halogenated inorganic acids such as dioctylchlorophosphate.

Included within the oil-soluble acids or acid producing compounds suitable for use as curing agents are those whose molecules contain one or all of the following atoms: Cl, Br, I, F, O, and N, with the minimum solubility requirement of the above being set at .05 gram per 100 grams of solvent at 25° C. Combinations of the various acid and acid forming compounds may also be used if desired.

As indicated, the epoxy resin systems can be utilized in practicing the catalyst or curing agent extraction process described above. Suitable epoxy resins are those prepared by reacting a polyhydric alcohol or a dibasic acid with epichlorohydrin, the resins being characterized by the inclusion of at least two reactive epoxy groups in the molecule. A particularly desirable expoxy compound which may be used in the present invention is known under the trademark Epon 828 (Shell Chemical Co.) and is a compound obtained by reacting diphenylolpropane with an excess of epichlorohydrin in alkaline medium, such compound having a molecular weight of 350 to 400 and containing on an average 1.85 epoxy groups per molecule. Many oil-soluble amines, dibasic acids and acid anhydrides are suitable for use as curing agents for epoxy resins in carrying out the process. Diethylene triamine, diethylamino propylamine, ethylene diamine, triethylene triamine, tridimethyl amino methyl phenol, benzyldimethylamine, metaphenylenediamine, and 4,4'-methylene diamiline are typical of the amine curing agents. The acid anhydrides are illustrated by oxalic, phthalic, pyromellitic dianhydride and dodecenyl succinic anhydride. As is the case with the other resins, reactive and non-reactive diluents and/or solvents for the epoxy resins can be utilized.

An adequate bond between the resin coating and the particle is generally obtained, but it has been found that excellent results, particularly when coating sand with resin coating compositions, are obtained by the inclusion in the composition of a minor amount of an organosilicon compound or silane which is soluble or dispersible in the resin system. Silanes or organosilicon compounds found to be particularly useful in obtaining strong bonds are those having the formulas:

(1) 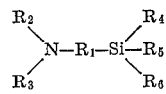

and (2) 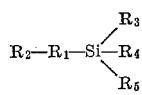

wherein:

(1) $R_1$=an alkyl group having from 3 to 10 carbon atoms with at least 3 carbon atoms being in a straight chain between the silicon and nitrogen atoms; $R_2$ and $R_3$=hydrogen, $R_7$, or $R_7X$, where $R_7$ is an alkyl group having from 1 to 5 carbon atoms, X is either an $NH_2$ or OH group, but both $R_2$ and $R_3$ cannot be $R_7$ alone in same compound; $R_4$ and $R_5$=$R_8$ or $OR_8$ where $R_8$ is an alkyl group having from 1 to 5 carbon atoms; $R_6$=$OR_8$; and (2) $R_1$=an alkyl group having from 2 to 5 carbon atoms; $R_2$=glycidoxy group or a cyclohexyl group having from 1 to 2 substituted epoxy groups; $R_3$ and $R_4$=$R_6$ or $OR_6$ where $R_6$ is an alkyl group having from 1 to 5 carbon atoms; $R_5$=$OR_6$.

U.S. Patent No. 2,930,809 also discloses a number of silanes or organosilicon compounds which may be used in this invention, as does U.S. Patent No. 2,832,754, which describes the synthesis of alkoxysilylpropylamines and aminopropylpolysiloxanes.

Some silanes which have been found to be particularly suitable are:

gamma aminopropyltriethoxysilane,
N-(beta-aminoethyl)-gamma-aminopropyltrimethoxysilane,
delta-aminobutylmethyldiethoxysilane,
N-methyl-gamma-aminoisobutyltriethoxysilane,
N-methyl-gamma-aminopropyltriethoxysilane,
delta-aminobutyltriethoxysilane,
N-(beta-aminoethyl)-gamma-aminopropyltriethoxysilane,
gamma dialkylaminopropyltriethoxysilane,
glycidoxypropyltrimethoxysilane and
3,4-epoxycyclohexylethyltrimethoxysilane.

As mentioned above, the catalyst or curing agent is extracted from a solution thereof in a solvent, preferably an oil which is immiscible and unreactive with the resin coating composition. Suitable solvents for the catalyst or curing agent include mineral oils such as crude oil, kerosene and the like, although it is preferred to use oils that are substantially free of aromatic and olefin hydrocarbons, such as an acid treated kerosene, diesel oil or a white oil. The preferred ratio of catalyst or curing agent to solvent varies with the particular curing temperature utilized and the nature of the catalyst or curing agent, but generally speaking from about 0.1 to 10 parts by weight of curing agent to 100 parts by weights of oil is preferred.

The following specific examples are illustrative of the curing agent extraction embodiment of the present invention, but it is to be understood that the invention is not to be limited to the specific details thereof.

EXAMPLE I

Each particle of a 100-gram batch of 40–60 mesh Ottawa sand was thinly coated with plastic in the following manner: Five cc. liquid resinous mix [85.2:1:159:7 parts by weight respectively of Durez 21687 furfuryl alcohol resin (Durez Plastics Division, Hooker Chemical Corporation), gamma-aminopropyltriethoxysilane, furfuryl alcohol, and water respectively] were coated on the solids by mechanical mixing. These treated solids were added slowly to a 80° F. diesel oil-trichloroacetic acid solution (100:0.5 parts by weight respectively) as it was being stirred. In less than 2 minutes the brown plastic around each sand grain turned black indicating the resin curing process had begun to take place. In 5 minutes the stirring was stopped. Most of the oil was decanted from the solids. After allowing the particles to stand for 18 hours at 80° F. and exposed to the air, the particles still remained as separate, discrete particles without any mutual adherence or agglomeration.

It will thus be understood that this process provides a simple, quick, well controlled and inexpensive method, utilizable at room temperature. Higher temperature can be used if desired and are preferred for less-reactive systems, temperatures in the range 200° F.–450° F. having been utilized.

EXAMPLE II

A number of experiments were conducted to demonstrate the low temperature (80° F.) extraction of catalyst from the oil solution by resin and nonomeric coating compositions used in the process of the present invention. In these tests, 50 cc. of the resin or monomer were thoroughly agitated for 30 seconds with 50 cc. of the catalyst-diesel oil solution containing 1% by weight of catalyst, the non-aqueous (oil) medium was then separated and chemically analyzed for catalyst concentration. The following table illustrates the results of such tests:

TABLE I.—CHEMICAL EXTRACTION OF TYPICAL CATALYSTS FROM NON-AQUEOUS SOLUTION AT 80° F.

| | Catalyst removed from solution, percent | | |
|---|---|---|---|
| | Trichloroacetic acid | Acetic acid | Hexachloroacetone |
| Furfural alcohol resin (Durez 21687) | 100 | 100 | 76.6 |
| Furfuryl alcohol (Quaker Oats) | 100 | 100 | 70.3 |
| Phenol formaldehyde (Durez 21587) | 100 | 100 | 27 |
| Urea formaldehyde resin [1] | 100 | 100 | [2] Nil |

[1] This consisted of 93:31.4:33.45 parts by weight respectively of Allied Chemicals UF-85 concentrate (25% urea, 60% formaldehyde, 15% water, the mole ratio of urea to formaldehyde being 1:4.8), urea and water.
[2] Extraction of this compound is believed to be favored with increased temperature.

EXAMPLE III

The process was carried out in the coating of both glass beads and sand with a resin composition containing radioactive $Zr-Nb^{95}$, for use of these materials as radioactive propping agents in fracturing operations. The following resin system was utilized:

| Component: | Parts by volume |
|---|---|
| Durez 21687 furfuryl alcohol resin | 66.7 |
| Gamma aminopropyltriethoxysilane | 1 |
| Furfuryl alcohol | 133.3 |
| Hyflo | 1 |
| Fresh water containing 2 units of $Zr-Nb^{95}$ | 6.7 |

Hyflo is a trademark of the Halliburton Company used to identify an oil soluble surface active agent as described in U.S. Patent No. 2,946,747. The $Zr-Nb^{95}$ (available from the Atomic Energy Commission, Oak Ridge, Tenn.) comprised a solution complex with saturated oxalic acid.

The catalyst system was as follows:

| Component: | Chemical ratios | |
|---|---|---|
| Hexachloroacetone | cc | 1 |
| Trichloroacetic acid | g | 0.1 |
| Diesel oil | cc | 1 |

The components of the resin system were blended in the order as listed above, the silane having been mixed thoroughly in a mechanical stir for ten minutes prior to the addition of the other ingredients. The final mix was thoroughly agitated so as to promote uniform dispersion of the radioactive trace elements through the solution. Similarly, the catalyst system was mixed in the same order as listed above, making sure that all of the solid trichloroacetic acid was dissolved.

Separate runs were made using both glass beads and sand (12–20 mesh), 25 pounds of these particulate materials being used with 100 cc. of the resin composition and 100 cc. of the catalyst solution.

The process was carried out in a continuous ribbon blender wherein the particulate solids were first coated with the resin composition, followed by blending with the catalyst solution. Following this blending, the treated particles were continuously routed into a chamber heated to approximately 250° F. to promote resin hardening and removal of the volatiles. It is estimated that the solids were at 200° F.–250° F. for 4–5 minutes in this operation. After cooling the dry particles down to below 200° F., a small quantity of diesel oil (50 cc.) was mixed therewith in the ribbon blender to promote desirable lubrication and handling properties.

The resin coated solids were subjected to washings with water, oil and other fluids and retention of radioactivity was found to be superior to conventional silicate-coated materials.

In a further embodiment of the present invention, the catalyst or curing agent is included in the original resin coating composition and the process of curing the applied coating is preferably carried out at an elevated temperature, e.g., in the range 200° F–450° F. Quite surprisingly, particulate material coated with catalyzed resin systems did not agglomerate in the process of applying and curing the coatings, possibly due in part at least to the utilization of the ribbon blender. In any event, an important feature of the invention resides in admixing or blending the liquid resin with the particulate material under conditions such that no appreciable compacting pressure is applied to the material being mixed and/or to the individual particles. Since this embodiment of the invention does not depend upon rapid extraction of the catalyst or curing agent from the oil solution, it affords a somewhat greater degree of flexibility in the selection of suitable resin-catalyst systems, all of the resins and catalysts referred to hereinabove being useful, as well as the more conventional systems such as, for example, acid catalyzed phenol-aldehyde type resins, urea-formaldehyde resins, epoxy resins, etc.

Moreover, such process is advantageous in that it permits the preparation of a catalyzed resin formulation which would be useable for extended periods of time when stored at normal warehouse temperatures, thus eliminating considerable mixing time loss. In the preparation of such catalyzed resin systems, the catalyst or curing agent must be essentially non-reactive at normal storage temperatures, but reactive at the elevated temperatures used in the process. Included among available latent catalysts of this type and suitable for use in the resin systems disclosed herein are the boron trifluoride-amine complexes such as boron trifluoride monoethylamine complex ($BF_3$–400, manufactured by Harshaw Chemical Company). Others include boron trifluoride complexed with monomethylamine, monoethanolamine, mono-N-amylamine, monocyclohexylamine, trimethylamine, triethylamine, tributylamine, triethanolamine and hexamethyl tetramine.

A further improvement in the process comprises the use of radioactive tracers complexed or solubilized with latent catalysts of the type described above, thus permitting addition of the isotopic tracer to the resin composition along with the latent catalyst, again permitting greater flexibility in operating procedures.

Glass beads, sand and walnut shells have been successfully resin-coated with the catalyzed resin systems, representative examples being as follows:

EXAMPLE IV

Twenty-five pounds of glass beads (10–20 mesh in size) were coated with 104.2 cc. of a solution comprised of furfuryl alcohol resin (Durez 21687) 33.3 ml.;

gamma-aminopropyltriethoxysilane, .5 ml.; furfuryl alcohol, 66.6 ml.; Hyflo, .5 ml.; saturated oxalic acid solution of isotope (.2 millicurie Zr-Nb$^{95}$), 3.3 ml. The treated solids while being agitated were routed through a continuous ribbon blendor into a heated chamber, (200–400° F.), the estimated contact time in chamber being 3–5 minutes. The glass beads as removed from the heated compartment were characterized by being separate and discrete. Each particle was coated with hardened plastic. The processed glass beads readily emitted significant radioactivity. A very small quantity of oil was mixed with the particles as they were transported by the ribbon blendor from the heated area. This promoted desirable lubrication, handling, and packaging properties. The oil treatment may however be left out of the procedure if desired, the treated solids still remaining as individual particles.

EXAMPLE V

The process of this example was substantially the same as that of Example IV, except that Ottawa sand (10–20 mesh) was substituted for the glass beads.

Catalyzed resin systems used in the process of the present invention can be diluted with suitable unreactive solvents for extremely thin-coat application, chlorinated hydrocarbon solvents such as carbon tetrachloride, trichloroethylene, etc. being especially suitable as presenting no fire hazard when subjected to the elevated temperatures generally used. An example of such process is as follows.

EXAMPLE VI

The coating technique was applied to porous walnut shells (ground to 20–40 mesh) in such a way that the density of the shells was not increased appreciably, while at the same time the radioactivity imparted to a specified bulk volume of the solids was held to a desired minimum. The resin formula used was as described in Example III.

To 25 pounds of walnut shells were added 300 cc. of a solution consisting of 100 cc. of resin-isotope mix diluted with 200 cc. trichloroethylene. The process was carried out in a continuous ribbon blendor wherein the coated particles were continuously routed through a heated chamber (approximately 250° F.). Contact time in chamber was estimated to be 3–5 minutes. The trichloroethylene solvent was evaporated off at around 250° F.

After cooling the dry particles a small quantity of diesel oil was mixed therewith in the ribbon blendor to promote desirable lubrication and handling properties.

The resin used was catalyzed at this elevated temperature by the saturated oxalic acid containing the Zr-Nb$^{95}$.

Polymerization and radioactivity retention of resin coatings appeared very satisfactory with these walnut shells.

As indicated hereinabove, furfuryl alcohol, either with or without a radioactive tracer, is a particularly suitable monomeric material for use in preparing particles having a resin coating thereon, especially where extremely thin coatings are desired. Among the advantages of furfuryl alcohol are its appreciably low viscosity which permits complete coating of the particulate solids with a minimum increase in density thereof; its excellent wetting properties for the solids being coated; its high degree of reactivity, approaching 100% polymer yield; and its low cost as compared with furan or phenol-formaldehyde resin systems, for example. Furfuryl alcohol is an excellent solvent for the oxalic acid complex at Zr-Nb$^{95}$, permitting excellent and uniform spread of the radioactive tracers. Furfuryl alcohol can be used very effectively at low or room temperatures, but having a high boiling point (about 340° F.), it can be used at elevated temperatures with minimum loss due to evaporation, excessive evaporation being undesirable not only from the standpoint of loss in yield, but in producing rough and porous coatings.

Furfuryl alcohol is so reactive when it is properly catalyzed, e.g., with chemical catalysts and/or heat, that the polymerization of the monomer and complete curing of the polymer thus formed is accomplished so rapidly that the tacky stage of polymerization is so short that individual particles do not tend to stick together as they are being transported through the processing equipment. The extreme thinness of furfuryl alcohol coatings further aids in prevention of particle adherence in that the polymerization and curing speed is again increased.

Furfuryl alcohol is perhaps unique among the polymerizable monomers in that it possesses the ability to self-polymerize and additionally requires no added cross-linking material. Furfural generates its own catalyst and ionizing medium once the polymerization has been initiated. When furfuryl alcohol polymerizes, it produces levulinic acid, water and formaldehyde, the reaction being exothermic, all of which tends to contribute to cure speed. Levulinic acid acts as a catalyst when mixed with the water and the formaldehyde is believed to function as a crosslinker for some of the furfural polymer.

In carrying out the process of the present invention as applied to the use of furfuryl alcohol as a coating material, either the catalyst extraction process or the pre-catalyzed system process as described above may be utilized, and with any of the catalysts or curing agents listed above, including the acid catalysts and acid-producing chemicals listed above, acid salts such as zinc chloride, calcium chloride and the like, levulinic acid and the boron trifluoride complexes. A true catalyst or curing agent can be entirely dispensed with, especially if the pH of the furfuryl alcohol is below 7, and with the addition of sufficient heat to initiate polymerization.

The following specific examples illustrate the use of furfuryl alcohol in accordance with the present invention.

EXAMPLE VII

One hundred grams of 20–40 mesh Ottawa sand was blended with 0.5 cc. of a furfuryl alcohol solution made up by adding 0.25 cc. of gamma-aminopropyltriethoxysilane and 1.6 cc. of water to 50 cc. of furfuryl alcohol, the small amount of furfuryl alcohol solution utilized being sufficient to encapsulate each sand particle. The thus-treated sand was added to a catalyst-oil solution of 2.5 cc. hexafluoroacetone and 250 cc. of diesel oil, as the solution was being stirred. The coating procedure was completed in less than 5 minutes at 80° F. and the oil solution was separated from the coated particles by screening. Polymerization and curing of the thin coating was accomplished in such a manner that each particle remained discrete and separate, the coatings being hard and cured to an infusible condition.

EXAMPLE VIII

The process of this example was the same as Example VII, except that 5 grams of trichloroacetic acid was substituted for the hexafluoroacetone in the catalyst-oil solution, and the necessary polymerization was complete after stirring the coated sand particles for 10 minutes in the catalyst-oil solution maintained at 200° F.

EXAMPLE IX

One hundred grams of 20–40 mesh Ottawa sand was coated with 0.5 cc. of a solution comprising 40 cc. of furfuryl alcohol, 10 cc. of Formalin, 5 cc. hexachloroacetone and 1.6 cc. water. The coated solids were heated to 200° F. for 3–5 minutes, whereupon the polymerization and curing was complete. The coating was so thin that with only a slight amount of agitation during the heating period, the particles remain separate and discrete.

The products produced by the processes as set forth in Examples VII, VIII and IX were subjected to water and oil wash tests, without visible change in the brown to black color of the polymerized furfuryl alcohol coatings, indicating good resistance to wash-off.

Examples of the production of furfuryl alcohol coatings including a radioactive tracer are as follows.

EXAMPLE X

One hundred grams of 20–40 mesh Ottawa sand were coated with 0.5 cc. of a solution composed of furfuryl alcohol, 50 cc.; water, 1.6 cc.; gamma-aminopropyltriethoxysilane, .25 cc.; hexachloroacetone, 5 cc.; $Zr-Nb^{95}$, 0.1 millicurie (0.5 unit). The mass of thinly coated solids while agitated were heated to 200° F. for 5 minutes whereupon the polymerization was completed. The resulting plastic encapsulated solids remained separated from each other. Radioactive counting equipment confirmed the presence of significant emitted radiation as originated from several represented samples of the treated solids, i.e., even after they were repeatedly washed with water and diesel oil.

EXAMPLE XI

One hundred grams of 20–40 mesh sand were coated with 0.5 cc. of a solution composed of furfuryl alcohol, 50 cc.; water, 1.6 cc.; gamma-aminopropyltriethoxysilane, 0.25 c.; $Zr-Nb^{95}$, 0.1 millicurie (0.5 unit). These solids were added slowly to a 250 cc. of diesel oil containing 2.5 cc. of trifluoroacetic acid. The solids and oil-catalyst (80° F.) solution were stirred vigorously for 5 minutes. The polymerization appeared completed at this point. The major portion of the oil was removed by decanting techniques. The resulting solids were then repeatedly washed with a surfactant-water solution to remove the residual oil. Several representative samples taken from the treated solids mass emitted very significant radiation.

An example of the production of coated particles utilizing a latent catalyst system is as follows.

EXAMPLE XII

One hundred grams of 20–40 mesh Ottawa sand were coated with 0.6 cc. of a solution composed of furfuryl alcohol, 50 cc.; water, 1.6 cc.; gamma-aminopropyltriethoxysilane, 0.25 cc.; boron trifluoride monoethylamine complex ($BF_3$–400 manufactured by the Harshaw Chemical Company), 4 grams. The treated solids while being agitated were heated to 220–240° F. for 5 minutes, whereupon the polymerization appeared completed.

The products of the present invention find particular utility in well fracturing operations and for such use are simply added to the fracturing fluid in place of all or part of the conventional propping agents such as sand or other particulate materials.

Having fully described our invention, it is to be understood that we do not wish to be limited to the details set forth but our invention is of the full scope of the appended claims.

We claim:

1. A process for the production of plastic coated particulate solids, comprising admixing the particulate solids with a quantity of a liquid material containing a resin forming composition selected from the group consisting of furfuryl alcohol, furfuryl alcohol resins, and mixtures thereof, said quantity being sufficient to provide a coating on each individual particle of said solids, and curing the coating so-formed to an infusible condition without substantial adherence between said individual particles by introducing said coated particulate solids into a heated oil which is immiscible with and unreactive with said liquid material.

2. The process of claim 1 wherein said resin forming composition is furfuryl alcohol.

3. The process of claim 1 wherein said resin forming composition is a furfuryl alcohol resin.

4. The process of claim 1 wherein said resin forming composition is a mixture of furfuryl alcohol and a furfuryl alcohol resin.

5. The process of claim 1 wherein a curing agent for said liquid material is dissolved in said oil, said liquid material being capable of extracting said curing agent from the oil solution.

6. The process of claim 5 wherein said curing agent is a compound selected from the group consisting of acid and acid-producing catalysts.

7. The process of claim 1 wherein said liquid material contains an organosilicon compound.

8. The process of claim 1 wherein said particulate solids comprise sand.

9. The process of claim 1 wherein said particulate solids comprise nut shells.

10. The process of claim 1 wherein said liquid material includes a reactive diluent.

11. The process of claim 1 wherein said liquid material includes a non-reactive solvent.

12. The process of claim 1 wherein said liquid material contains a curing agent.

13. The process of claim 12 wherein said liquid material contains a boron trifluoride complex curing agent and wherein said curing step is carried out at an elevated temperature.

14. The process of claim 1 wherein said liquid material contains a solution of a radioactive tracer in oxalic acid, the amount of said oxalic acid being sufficient to function as a curing agent for said coatings.

15. The process of claim 1 wherein said liquid material contains a furfuryl alcohol resin containing a solution of a radioactive tracer in oxalic acid, the amount of said oxalic acid being sufficient to function as a curing agent for said coatings, and wherein said curing step is carried out at a temperature in the range of 200°–450° F.

16. The process of claim 1 wherein said liquid material contains a radioactive tracer.

References Cited

UNITED STATES PATENTS

| | | | |
|---|---|---|---|
| 2,059,983 | 11/1936 | Dent et al. | 117—100 X |
| 2,092,903 | 9/1937 | Benner et al. | 117—100 |
| 2,125,827 | 8/1938 | Turkington | 117—119.8 |
| 2,282,479 | 5/1942 | Johnston | 117—27 |
| 2,832,754 | 4/1958 | Jex et al. | 161—190 |
| 2,878,111 | 3/1959 | Daniels et al. | 117—100 X |
| 2,890,345 | 6/1959 | Muffly | 117—220 X |
| 2,912,402 | 11/1959 | Less et al. | 117—100 X |
| 2,930,809 | 3/1960 | Jex et al. | 260—46.5 X |
| 2,936,287 | 5/1960 | Kazenas | 117—100 X |
| 2,946,747 | 7/1960 | Kirkpatrick et al. | 252—338 X |
| 2,977,925 | 4/1961 | Norton | 117—220 |
| 2,981,334 | 4/1961 | Powell | 117—100 |
| 3,041,195 | 6/1962 | Saewert et al. | 117—62.2 X |
| 3,053,690 | 9/1962 | Jaffe et al. | 117—161 X |
| 3,099,574 | 7/1963 | Bernier | 117—27 X |
| 3,138,802 | 6/1964 | Getchell | 117—62.2 X |
| 3,158,592 | 11/1964 | Nielsen | 117—161 X |
| 3,209,826 | 10/1965 | Young | 117—100 |
| 3,225,495 | 12/1965 | de Vries | 117—100 X |

WILLIAM D. MARTIN, Primary Examiner

U.S. Cl. X.R.

117—100, 119.6